United States Patent Office 2,729,644
Patented Jan. 3, 1956

2,729,644

INNER SALTS OF SUBSTITUTED 2-DITHIO-CARBAZIC ACIDS AND PROCESS

Hein L. Klopping, Wilmington, Del., assignor to E. I. du Pont de Nemours and Company, Wilmington, Del., a corporation of Delaware No Drawing. Application September 8, 1952,
Serial No. 308,528

5 Claims. (Cl. 260—294.8)

This invention relates to substituted dithiocarbazic acid inner salts containing a quaternary ammonium radical and to their preparation. More particularly, the invention is directed to dithiocarbazic acids, hydrazides with carboxymethyl quaternary ammonium compounds, inner salts, and hydrates thereof.

The inner salts of the invention are represented by the formula (1) 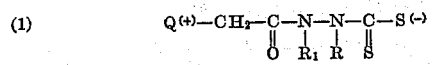

where $Q^{(+)}$ is a quaternary ammonium radical and R and $R_1$ are the same or different and represent hydrogen or an alkyl radical; preferably the alkyl is lower alkyl, that is 1 to 6 carbon atoms inclusive.

Illustrative of the substituted dithiocarbazic acid inner salts of the invention are:

1-(carboxymethyl)pyridinium ion, dithiocarbazic acid inner salt
1-(carboxymethyl)trimethylammonium ion, dithiocarbazic acid inner salt hydrate
1-(carboxymethyl)triethylammonium ion, dithiocarbazic acid inner salt
1-(carboxymethyl)triethylammonium ion, N,N'-dimethyldithiocarbazic acid inner salt
1-(carboxymethyl)trimethylammonium ion, N-ethyldithiocarbazic acid inner salt
1-(carboxymethyl)trimethylammonium ion, N-methyl,-N'-ethyldithiocarbazic acid inner salt
1-(carboxymethyl)trimethylammonium ion, N,N'-dibutyldithiocarbazic acid inner salt The compounds of the invention are prepared by the reaction of an aminoacetohydrazide hydrohalide represented by the formula (2) 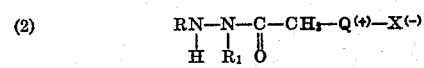

where R, $R_1$ and $Q^{(+)}$ have the same significance as in Formula 1 and X is chlorine or bromine, with carbon disulfide in an alkaline medium.

The hydrohalides of Formula 2 used in the preparation of the compounds of the invention can be prepared by reacting ethylchloroacetate and a nitrogen containing compound such as, for instance, ammonia, a trialkylamine, morpholine or pyridine, with a mono- or dialkyl substituted or unsubstituted hydrazine. This reaction may be illustrated diagrammatically by the following equation

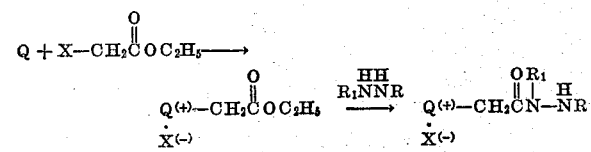

where X, $Q^{(+)}$, R and $R_1$ have the same significance as in Formula 2.

The preferred aminoacetohydrazide hydrohalides for the preparation of the inner salts of Formula 1 are Girard's "P" reagent and Girard's "T" reagent. Both are commercially available.

Girard's "T" reagent (trimethylaminoacetohydrazide hydrochloride, also known as betaine hydrazide hydrochloride) can be readily prepared by reacting ethyl chloroacetate and trimethylamine with hydrazine hydrate by the procedure described on page 85 of "Organic Syntheses," Collective Volume 2, John Wiley & Sons Inc., New York, 1943.

Girard's "P" reagent may be prepared in a manner identical with the method employed for preparing Girard's "T" reagent with the exception that pyridine is substituted for trimethylamine. Girard's "P" reagent can be represented graphically by Formula 2 where R and $R_1$ are hydrogen, $X^{(-)}$ is chloride and $Q^{(+)}$ is a pyridinium radical.

The reaction between the aminoacetohydrazide hydrohalide of Formula 2 and carbon disulfide is most readily carried out in aqueous medium to which some alkali, for example, sodium hydroxide has been added.

The compounds of the present invention are highly potent fungicides having negligible phytotoxicity. They are particularly well suited for application against diseases in plants and vegetable crops inasmuch as they contain no heavy metal ions customarily found in the known "dithiocarbamic acid type" fungicides.

In order to better understand the invention, reference should be had to the following illustrative examples:

*Example 1*

Preparation of 1-(carboxymethyl)pyridinium ion, dithiocarbazic acid inner salt

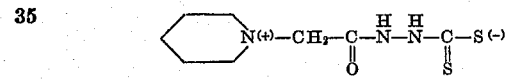

A solution of 18.7 grams of Girard's "P" reagent in 100 ml. of water is mixed with 7.6 grams of carbon disulfide. The resulting mixture is stirred. To the stirred mixture there is added dropwise a solution of 4 grams of sodium hydroxide in 25 ml. of water. As stirring is continued, an oil forms which eventually solidifies to yellow crystals. The crystals are filtered with suction, collected, washed with water and acetone and dried. These crystals of 1-(carboxymethyl)pyridinium ion, dithiocarbazic acid inner salt begin to give off gas at 195° C. and do not completely char at 300° C. The yield of product is 18 grams.

*Analysis.*—Calculated for $C_8H_9ON_3S_2$: C, 42.27; H, 3.99; N, 18.49; S, 28.21. Found: C, 42.32; H, 4.06; N, 18.64; S, 28.16.

*Example 2*

Preparation of 1-(carboxymethyl)trimethylammonium ion, dithiocarbazic acid inner salt, hydrate

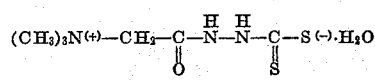

A solution of 16.7 grams of Girard's "T" reagent in 80 ml. of water is mixed with 7.6 grams of carbon disulfide. The resulting mixture is stirred, and a solution of 4 grams of sodium hydroxide in 20 ml. of water is added dropwise to the mixture. Stirring of the reactants is continued. A white precipitate gradually forms. After a period of 7 hours the crystalline precipitate is collected by filtration, washed with water and acetone, and dried. The white crystalline product, which is the desired compound, begins to decompose above 150° C. and melts with decomposition at 214–215° C. The yield of desired product is 15 grams.

*Analysis.*—Calculated for $C_6H_{15}N_3O_2S_2$: C, 31.98; H, 6.71; N, 18.65; S, 28.46. Found: C, 31.95; H, 6.70; N, 18.54; S, 28.13.

Example 3

Preparation of 1-(carboxymethyl)triethylammonium ion, N,N'-dimethyldithiocarbazic acid inner salt

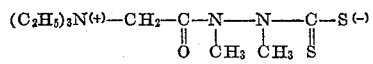

A solution of 98 grams of ethyl chloroacetate in 200 ml. of absolute alcohol is cooled to a temperature of 0° C. To this cooled solution there is added 84 grams of triethylamine. The reaction, which is exothermic, is controlled by external cooling so that the temperature of the reaction mixture rises to 60° C. in a period of one hour. After the solution is allowed to stand at room temperature for a period of 20 hours, it is stirred, and 48 grams of 1,2-dimethylhydrazine are added thereto over a period of 15 minutes. After the resulting mixture is stirred for a period of one hour, it is cooled. A crystalline reaction product is collected on a filter, washed with 150 ml. of cold absolute alcohol and dried. The product consisting mainly of (carboxymethyl)triethylammonium chloride,-N,N'-dimethylhydrazide, weighs 150 grams.

A solution of 23.7 grams of (carboxymethyl)tri-ethyl-ammonium chloride,N,N'-dimethylhydrazide prepared above in 100 ml. of water is mixed with 7.6 grams of carbon disulfide. The mixture is stirred, and a solution of 4 grams of sodium hydroxide in 20 ml. of water is added dropwise. Stirring of the mixture is continued. A crystalline precipitate, which is the desired product, gradually forms. After a period of seven hours the mixture is filtered with suction, the crystals collected, washed with water and acetone and dried.

I claim:

1. A compound of the group consisting of inner salts of the formula

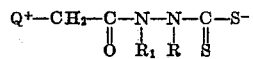

and hydrates of said salts, where Q is a member of the class consisting of tri(lower alkyl)ammonium and pyridinium groups, and R and $R_1$ are selected from the class consisting of hydrogen and alkyl.

2. 1-(carboxymethyl)triethylammonium ion, N,N'- dimethyldithiocarbazic acid inner salt.

3. 1-(carboxymethyl)trimethylammonium ion, dithiocarbazic acid inner salt, hydrate.

4. 1-(carboxymethyl)pyridinium ion, dithiocarbazic acid inner salt.

5. In a process for preparing 1-(carboxymethyl)pyridinium ion, dithiocarbazic acid inner salt, the step comprising reacting 1-(carboxymethyl)pyridinium chloride hydrazide with carbon disulfide in the presence of aqueous sodium hydroxide.

References Cited in the file of this patent
UNITED STATES PATENTS

| | | |
|---|---|---|
| 2,045,132 | Girard et al. | June 23, 1946 |
| 2,626,258 | Ward | Jan. 20, 1953 |

OTHER REFERENCES

Billman et al.: J. Am. Chem. Soc., vol. 65, pp. 1300–01 (1943).